United States Patent [19]

Maddern et al.

[11] Patent Number: 5,589,258
[45] Date of Patent: Dec. 31, 1996

[54] NON-WOVEN FABRIC COMPRISING AT LEAST ONE SPUNBONDED LAYER

[75] Inventors: Peter Maddern; Kenneth J. G. Currie, both of Clwyd, Great Britain

[73] Assignee: Kimberly-Clark Limited, Kent, England

[21] Appl. No.: 799,927

[22] Filed: Nov. 26, 1991

Related U.S. Application Data

[63] Continuation of Ser. No. 380,178, Jul. 14, 1989, abandoned, which is a continuation of Ser. No. 130,386, filed as PCT/GB87/00211, Mar. 27, 1987, abandoned.

[30] Foreign Application Priority Data

Mar. 27, 1986 [GB] United Kingdom .................. 8607803

[51] Int. Cl.$^6$ .............................. B32B 5/26; B32B 31/20; B32B 31/22
[52] U.S. Cl. ..................... 428/286; 156/62.2; 156/167; 156/181; 156/290; 428/288; 428/290; 428/296
[58] Field of Search ..................... 428/284, 286, 428/288, 290, 296, 302, 361, 375, 394, 396; 156/62.2, 167, 181, 209, 290, 296, 308.6, 309.3

[56] References Cited

U.S. PATENT DOCUMENTS

| | | | |
|---|---|---|---|
| 3,692,618 | 9/1972 | Dorschner et al. | 161/72 |
| 3,870,592 | 3/1975 | Brock et al. | 156/291 |
| 4,041,203 | 8/1977 | Brock et al. | 156/291 |
| 4,196,245 | 4/1980 | Kitson et al. | 428/284 |
| 4,340,563 | 7/1982 | Appel et al. | 264/518 |
| 4,374,888 | 2/1983 | Bornslaeger | 428/296 |
| 4,379,192 | 4/1983 | Wahlquist et al. | 156/209 |
| 4,426,417 | 1/1984 | Meitner et al. | 428/296 |
| 4,436,780 | 3/1984 | Hotchkiss et al. | 428/296 |
| 4,504,978 | 3/1985 | Gregory, Jr. | 2/59 |
| 4,508,113 | 4/1985 | Malaney | 428/296 |
| 4,564,552 | 1/1986 | Adiletta | 428/284 |
| 4,657,804 | 4/1987 | Mays et al. | 156/308.2 |
| 4,659,609 | 4/1987 | Lamers et al. | 428/296 |
| 4,818,597 | 4/1989 | DaPonte et al. | 428/286 |

FOREIGN PATENT DOCUMENTS 0164739  12/1985  European Pat. Off. .

Primary Examiner—Steven D. Maki
Attorney, Agent, or Firm—William D. Herrick

[57] ABSTRACT

Nonwoven material comprising a web of spunbonded polymer filaments in combination with at least one other spunbond or meltblown nonwoven layer with the combination impregnated with a stabilizing agent and the spunbond layer having been hot calendered to improve surface abrasion resistance. Preferred embodiments using a coating bath also including a surfactant and smooth calendering.

11 Claims, 7 Drawing Sheets

NON-WOVEN FABRIC COMPRISING AT LEAST ONE SPUNBONDED LAYER

This is a continuation of application Ser. No. 07/380,178 filed on Jul. 14, 1989 now abandoned which is a continuation application of application Ser. No. 07/130,386, filed on Nov. 20, 1987, now abandoned which is a 371 of PCT/GB87/00211 filed Mar. 27, 1987.

This invention relates to non-woven laminated fabric-like material made of predominantly synthetic fibres.

It has hitherto been proposed to make articles such as disposable workwear garments from a material which comprises two layers of substantially continuous polymeric filaments formed by a spunbonded process into a web, the thermoplastic polymer being extruded through a spinnerette or the like to form discrete filaments which are, thereafter, drawn and deposited in a substantially random manner on a carrier belt or the like to form a web. Such web material will hereafter be referred to as "spunbonded" web material. The two layers of spunbonded polymeric material sandwich a layer of polymeric material formed by a melt-blown process into a web, molten polymeric material being extruded into fine streams which are broken up by a flow of high velocity heated gas into discontinuous fibres of small diameter, the fibres being subsequently collected on a screen, drum or the like to produce a web of microfibres. The web possesses integrity due to the entanglement of the individual fibres in the web as well as some degree of thermal or self-bonding between the fibres. Such web material will hereafter be referred to as melt-blown polymeric web material.

The polymers used to prepare both the spunbonded and melt-blown webs can be a wide variety of thermoplastic polymers of either the same or different type. Polypropylene is a particularly useful polymer for this purpose.

The three web layers, i.e. the two outer layers of spunbonded fibers and the central layer of melt-blown fibers, are pattern bonded together by the application of heat and pressure by passing the webs for example through the nip between two rollers one of which is provided with raised points. Alternatively the web layers can be ultrasonically bonded together. The bonds may comprise between 10 to 50 percent of the surface area, preferably 10 to 30 percent.

The filaments in the outer spunbonded web layers may for example have a diameter of between 15 to 25 microns and those in the inner melt-blown web layer have a diameter of 2 to 10 microns.

The material may have a basis weight of less than about 4 ozs per square yard, and is preferably 1.8 ozs per square yard.

Further details of this material and the method of manufacture thereof are disclosed in U.S. Pat. No. 4,041,203 (Brock & Meitner, assigned to Kimberly-Clark Corporation).

A laminate non-woven material comprising two webs of spunbonded fibers sandwiching a central web of melt-blown fibers, as described above, will hereafter be referred to as non-woven laminate material of the type described.

When non-woven laminate material of the type described is used for example to make a disposable workwear garment it has been found that the material gives the benefits both of a particle and liquid barrier provided by the central melt-blown web layer and comfort due to the permeability to air and water vapor of the laminate material. The outer layers of spunbond web material give some protection against abrasion. The laminate material therefore provides good protection to a wearer against penetration of hazardous fibers e.g. asbestos fibres and hazardous dust whilst offering comfort in use.

However, it has been found that whilst material of the type described may have good surface abrasion resistance for some garment end uses, for other applications further improvement is needed. If this material is used in conditions where heavy abrasive wear is likely to take place the fibers in the outer spunbonded web layers can break between the bond areas causing the surface to "fuzz" and to form fibre "pills" which can detach from the surface and contaminate the environment, e.g. in a spray-paint plant. The resulting contamination can be a problem in critical environments such as vehicle spray painting, electronic manufacturing, pharmaceuticals preparation and general "clean" environments. Equally in certain applications requiring protection of the wearer from large amounts of fibers or dusts, a "fuzzy" fiber surface can trap excessive amounts of fibers or dust which can build up and be subsequently released in relatively large concentrations into the breathing zone of the wearer. It is thus desirable to produce a fabric for workwear and the like, which has a highly bonded, smooth abrasion-resistant surface which is resistant to "fuzzing" and linting and which deters adherence of dust whilst at the same time being sufficently permeable to air/water vapour to be comfortable to wear and which reduces any tendency of the wearer to suffer from heat stress.

Non-woven material in accordance with the invention comprises a web of spunbonded polymeric filaments the web being impregnated with a thermal stabilizing agent before hot calendering on at least one side.

The material is preferably a laminate of two outer spunbonded layers sandwiching a central melt-blown layer but may be a laminate of a single spunbonded layer and a melt-blown layer, the laminate(s) being impregnated with a thermal stabilising agent before hot calendering on an least one side. Such material is particularly suitable for disposable workwear garments.

The spunbonded layer(s) may be calendered on either one side which is suitable for garments (with the calendered side on the outside) or the two outer sides to make it suitable for use in other applications, e.g. wipes.

The calendered outer surface(s) is found to be much more resistant to abrasion than untreated surfaces and the use of the thermal stabilising agent appears to play an important part in achieving optimum results.

The thermal stabilising agent is preferably a low surface tension fluid repellent agent having a significantly higher melting point than polypropylene and preferably a fluorocarbon.

The preferred fluorocarbon is a block copolymer of a perfluoroalkyl acrylate and a polyethylene substitituted acrylate.

It is believed that different types of fluorocarbons will also be effective. For example, fluorocarbons containing trifluoromethylsilyl groups instead of perfluoroalkyl groups.

It is also believed that silicone oils such as poly dimethyl siloxanes will be effective as well as polyethylene glycols.

The fluorocarbon may be mixed with lithium nitrate (e.g. in a 40:1 ratio by weight). The fluorocarbon acts to repel low surface tension liquids (e.g. alcohol) and the lithium nitrate gives a degree of continuity which disperses static charges.

The fluorocarbon is believed to retard complete flow of fibres into a film thus causing optimum retention of the desirable fibre structure.

Such calendering is preferably carried out by passing the material through a nip of a smooth heated roller and a non-heated roller. Preferably the heated roller is of steel and the backing roller is made for example of plastic, cotton or paper.

Preferably the roller is heated to a temperature substantially the same as the melting point of the polymer of the fibres in the layer to be calendered e.g. 167° C. (333° F.) for polypropylene.

The nip is set so as to give a light pressure e.g. 40 kg per cm and the material is passed through the nip sufficiently quickly so that in effect the surface is given a "shock heat" treatment which acts to produce additional fiber to fiber bonds in the surface spunbond layer in contact with the heated roller between the primary pattern bonds already produced by the bonding rollers. The arrangement is such that whilst the fibers in the calendered surface react to the input of heat, (depending on the conditions) the fibers in the central melt-blown layer are less affected by the input of heat so that its filter barrier and porosity properties are not completely degraded. An abrasion resistant surface is produced with the ends of any loose fibers being held within the layer. By varying the conditions one can either have a high temperature and have a longer time within the nip to give a higher abrasion resistance with relatively low permeability or with a lower temperature and somewhat higher line speed, a reasonably good abrasion resistance and reasonably better permeability can be created. Basically, if the temperature is raised, then the line speed may be increased to achieve the same abrasion resistance.

Also at a given line speed and temperature, abrasion resistance increases with increasing nip pressure at the expense of air permeability.

In use "pilling" of the smooth calendered surface, which is placed on the outside of the workwear garment, is substantially eliminated and whilst the air permeability of the fabric is reduced it is still very acceptable. Furthermore, the fabric does not have a fuzzy surface which tends to hold fibres or dust causing later problems of inhalation.

Whilst the spunbonded fabric may be the conventional spunbond material made in accordance with the teachings of U.S. Pat. No. 3,692,618, it is preferred that the spunbonded layers be made by a process as taught in U.S. Pat. No. 4,340,563.

Either one or both spunbond sides of the material may be smooth calendered. When both sides are calendered the material could be used for other applications for example wipes. The wiping surfaces would have low lint for critical wiping applications. Such a fabric calendered on both sides could also usefully be used in a variety of other applications demanding good surface durability, examples of which could include protective bedding fabrics, for mattresses and pillows, robot cover fabrics, and agricultural fabrics, for example, a substrate fabric for a thermal screen in a greenhouse.

It is preferred for workwear garments that the material of the type described be treated before calendering by impregnating it with a fluorocarbon and preferably also lithium nitrate mixture and drying it, e.g. at a temperature of 300° F. (149° C.). This, for example, may be achieved by running the material through a bath containing the salt and fluorocarbon together with a wetting agent. The material may then be squeezed to remove excess liquid and then passed over heated drums to drive off the water. For example, the material may be passed around six stacks each comprising ten steam heated drums the stacks having a temperature, in the direction of the fabric run from an initial stack temperature of 300° F. (149° C.) to a final stack temperature of about 260° F. (127° C.), leaving the fabric with the desired coating.

It is believed that the pre-calendering fluorocarbon lithium nitrate impregnation and heat treatment gives material so treated, after calendering, a better textile feel, softness and drape, noise level air permeability and strength, as compared with untreated material.

The material may be impregnated with the fluorocarbon and calendered either as part of the manufacturing process or subsequently to the production of the laminate.

The invention will now be further described by way of example with reference to the accompanying drawings in which.

Figure 1:
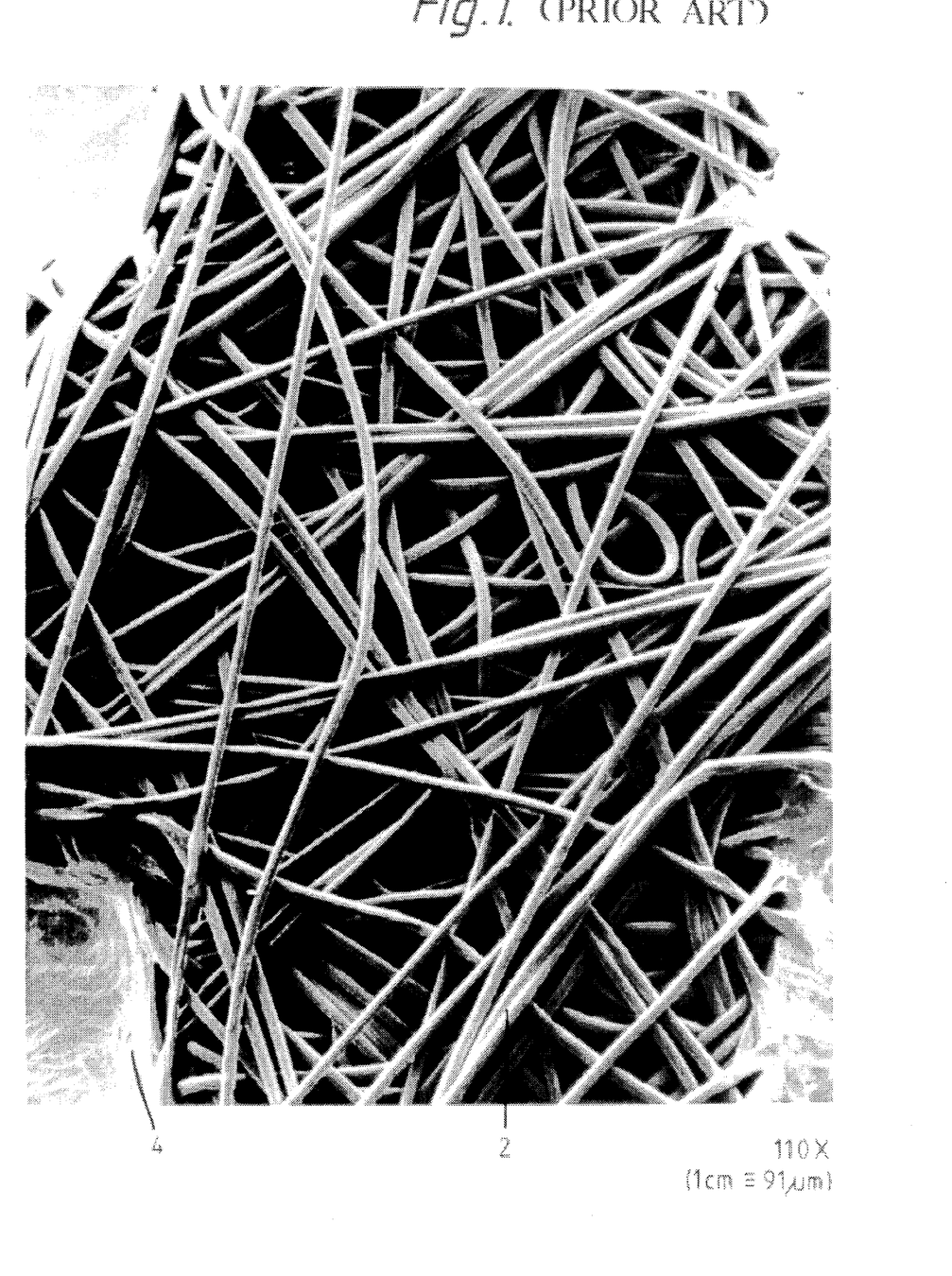
FIG. 1 is a photograph enlarged by a factor of one hundred and ten, of the surface of an outer spunbonded web layer of non-woven laminate material of the type described without treatment by the hot smooth-calendering process of the invention.

Referring to FIG. 1 the filaments are illustrated at 2, the bond areas being shown at 4. It can be seen that the length of the continuous spunbond filaments between the bond areas is relatively large giving rise to the problem of breakages due to abrasion.

Figure 2:
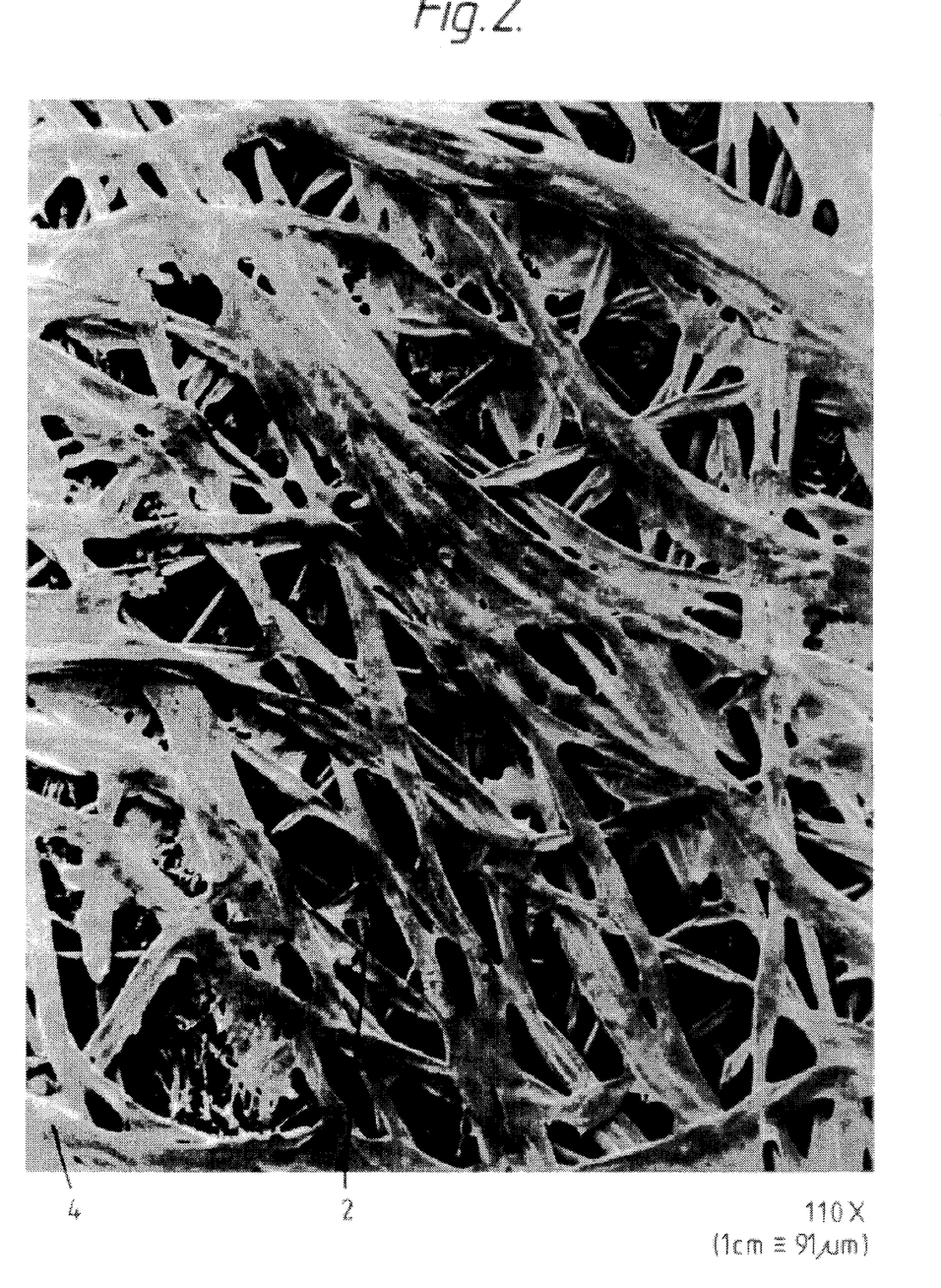
FIG. 2 is a photograph similar to that of FIG. 1 but showing the same material after calendering in accordance with the invention.

In FIG. 2 it will be seen that the filaments 2 have interlinking bonds between the bond areas but only in the surface portion of the material, leaving the center melt-blown layer relatively untouched.

Figure 3:
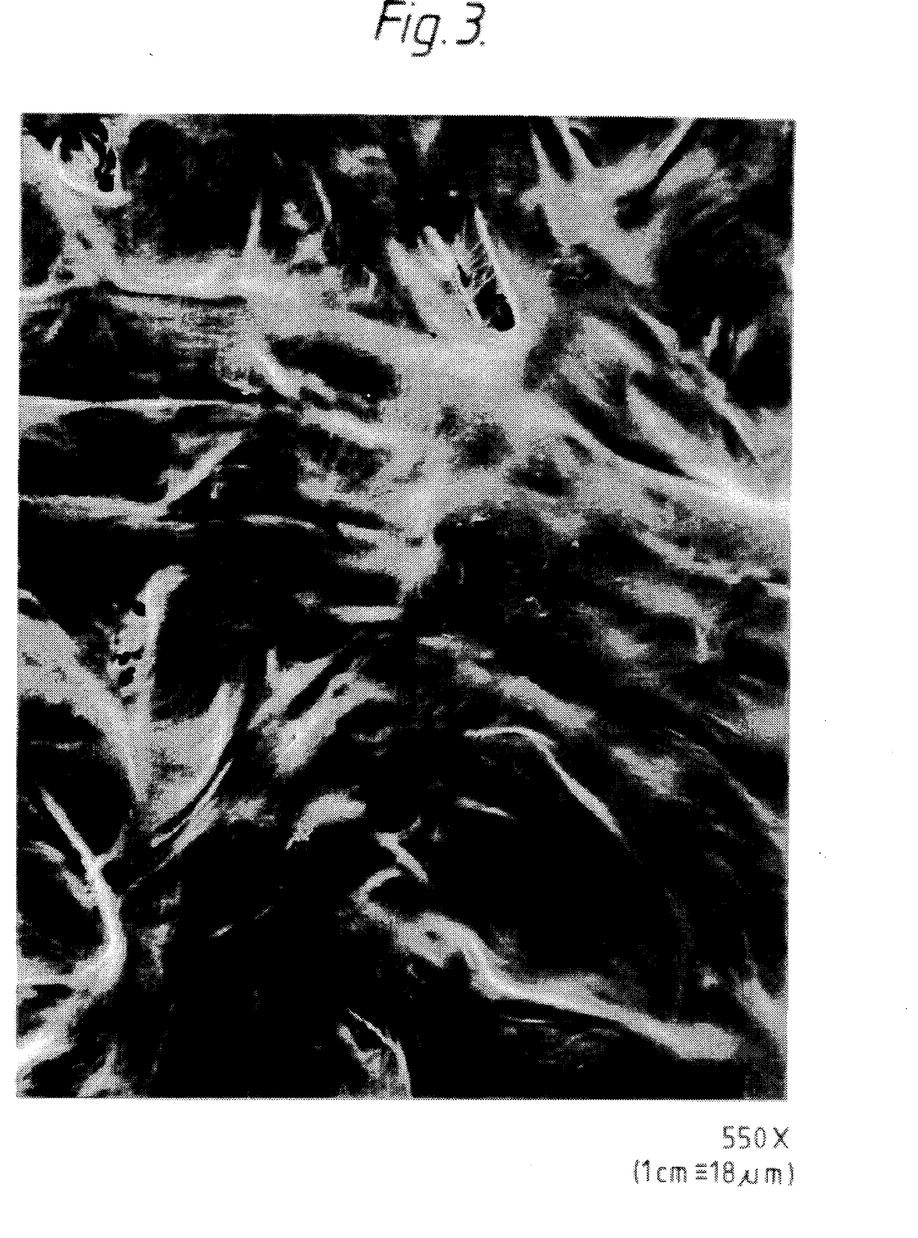
FIG. 3 is a photograph enlarged by a factor of five hundred and fifty of the outer surface of a spunbonded web layer of non-woven laminate material of the type described which has been hot calendered without treatment by a thermal stabilizing agent.

To ascertain the effectiveness of these pre-calendering treatments and to determine whether the improvement with the treated material is due to the presence of the chemicals or the drying process, the following fabrics were prepared and calendered by way of example:

FABRIC I—base material, no post production treatments prior to calendering. (see FIG. 3).

Figure 4:
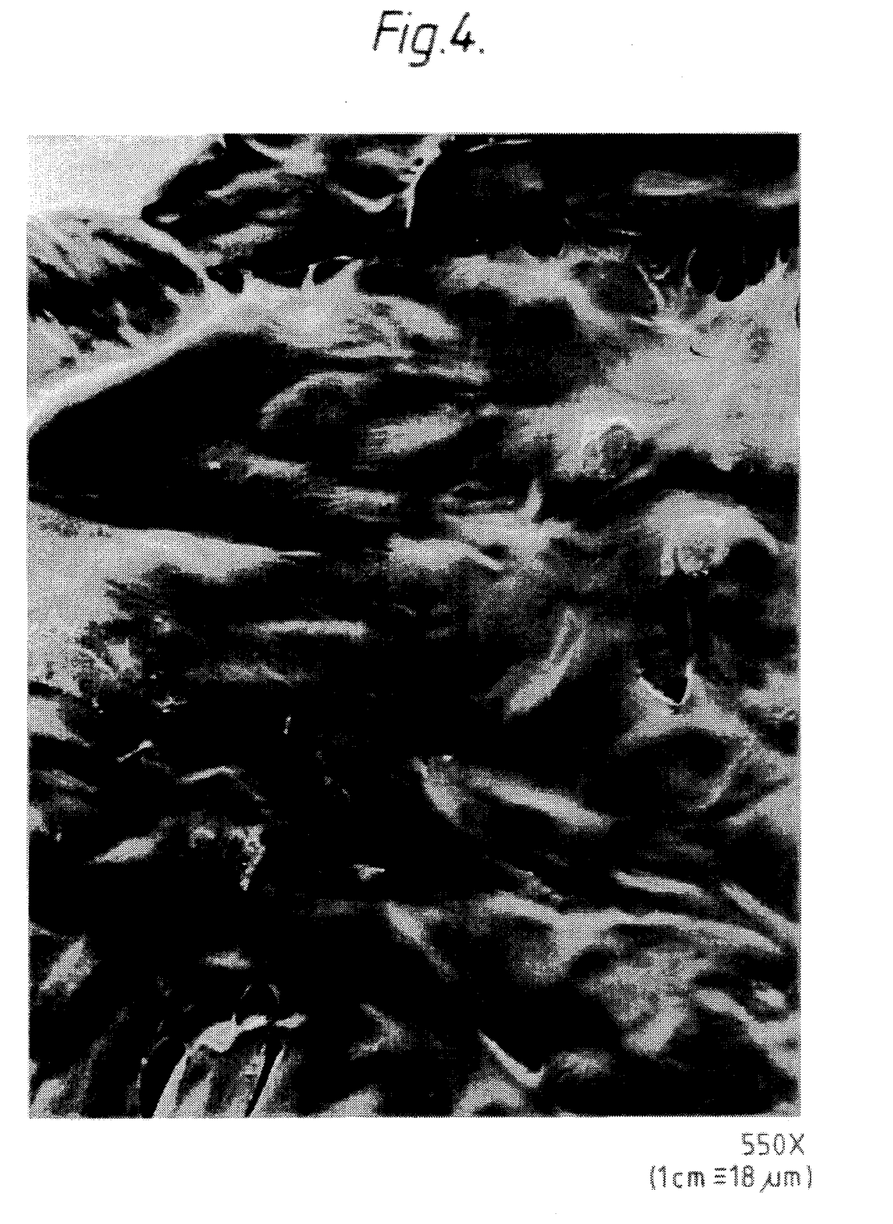
FIG. 4 is a photograph similar to FIG. 3 and of the same material but which had been treated with water which had been dried before calendering.

FABRIC II—base material which was passed through an aqueous bath containing a fugitive wetting agent and subsequently squeezed to remove excess liquid before being passed over heated drums to remove any water remaining, as described in the example cited above (see FIG. 4).

Figure 5:
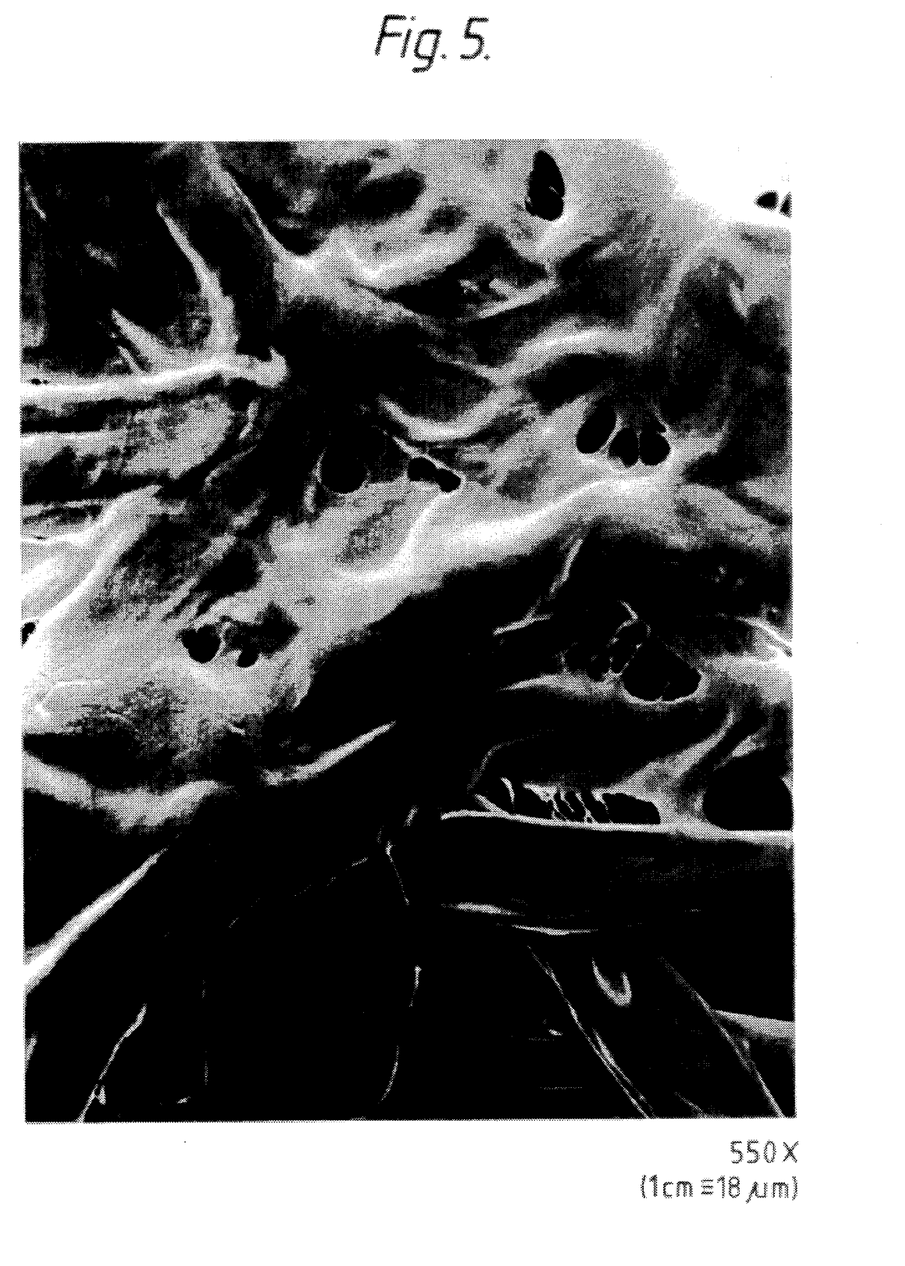
FIG. 5 is a photograph similar to FIGS. 3 and 4 and of the same material but which had been treated with a thermal stabilizing agent.

FABRIC III—base material which was passed through an aqueous bath containing the fluorocarbon and lithium nitrate mixture together with a fugitive wetting agent and subsequently squeezed to remove excess liquid before being passed over heated drums to drive off the water, as described in the example cited above (see FIG. 5).

All three fabrics were then hot calendered under identical conditions, though not necessarily those required to give the optimum benefits cited by this invention.

The following table summarises post production treatments, the calendering conditions, and relevant test data.

| | POST-PRO-DUCTION TREAT-MENT | CALENDARING CONDITIONS | | | ABRASION RESISTANCE (TO DESTRUCTION) | AIR PERM cm/min | TEST DATA GRAB TENSILE | | | | TRAP TEAR | | | |
|---|---|---|---|---|---|---|---|---|---|---|---|---|---|---|
| | | TEMP °C. | PRESSURE kg/cm | LDS SPEED m/min | | | STRENGTH (kg) | | WORK (kg/mm) | | STRENGTH (kg) | | WORK (kg/mm) | |
| | | | | | | | MD | CD | MD | CD | MD | CD | MD | CD |
| CALENDERED | | | | | | | | | | | | | | |
| FABRIC I | None | 167 | 40 | 15 | 10000 | Closed | 8.56 | 12.28 | 165 | 255 | 0.82 | 1.41 | 46 | 85 |
| | | 167 | 40 | 35 | 4000 | 6 | 9.36 | 12.05 | 230 | 333 | 1.31 | 2.26 | 79 | 121 |
| FABRIC II | De-ionised water, wetting agent, drying. | 167 | 40 | 15 | 3050 | 4 | 8.70 | 9.85 | 200 | 256 | 1.09 | 1.71 | 52 | 87 |
| | | 167 | 40 | 35 | 900 | 31 | 9.96 | 9.45 | 258 | 260 | 1.82 | 1.51 | 92 | 82 |
| FABRIC III | De-ionised water, wetting agent, fluorocarbon/lithium nitrate, mixture drying. | 167 | 40 | 15 | 700 | 12.3 | 8.42 | 9.29 | 255 | 259 | 1.71 | 1.33 | 98 | 87 |
| | | 167 | 40 | 35 | 650 | 62.5 | 8.36 | 7.94 | 293 | 248 | 1.52 | 1.40 | 94 | 83 |
| NON-CALENDERED BASE FABRIC | | | | | | | | | | | | | | |
| FABRIC I | | — | — | — | Typically 050–100 | Typically 90–100 | 13.61 | 11.50 | | | 1.91 | 3.50 | | |
| FABRIC II | | — | — | — | Typically 050–100 | Typically 90–100 | 12.96 | 8.85 | | | 2.49 | 1.94 | | |
| FABRIC III | | — | — | — | Typically 050–100 | Typically 90–100 | 11.28 | 9.09 | | | 2.13 | 2.3613 | | |

These results show that Fabric III has been least affected by the calendering treatment. Fabric III retains a more open, fibrous surface as evidenced by the high permeability and low abrasion resistance results, conversely the low permeability, high abrasion resistance results obtained for Fabrics I and II indicate a more closed, film-like surface. Fabric III also resists tear propagation better than either Fabrics I and II, as evidenced by the higher work values cited for Grab Tensile and Trap Tear results. This further confirms the more fibrous nature of Fabric III. The more open surface of Fabric III can be seen by comparing FIG. 5 with FIGS. 3 and 4.

These results imply that it is the presence of the fluorocarbon/lithium nitrate coating which is responsible for the way in which the chemically treated fabric responds favorably to the calendering rather than any heat treatment received during the drying of the fabric.

It is thought that this is a consequence of the higher melting point of the fluorocarbon compared to polypropylene. Without the fluorocarbon coating, the fibers react at the meeting point to calendering under pressure by melting and flowing into a film. With a fluorocarbon coating present, molten polypropylene polymer is encased by a solid exterior. This allows some flowing and fiber to fiber bonding but retards complete film formation compared to untreated material calendered under identical conditions.

However, it is believed that any coating which forms a separate phase around the polypropylene and which prevents wetting of melted polypropylene fibres should be effective.

As explained previously the extent of the interbonding of the spunbond fibres will vary, with a corresponding variation in abrasion resistance and air permeability depending upon the temperature of the heated calender roller, the nip pressure and the dwell time in the nip of the rollers.

As an example the following table shows the results of the abrasion resistance and air permeability on some examples of fabric material of the type described in accordance with the invention compared with a fabric not treated in accordance with the invention. All the fabric examples are of spunbonded/melt-blown/spunbonded construction of 1.8 ozs per square yard basic weight and processed on narrow width pilot equipment.

The diameter of the spunbonded filaments is say 23 microns and that of the melt-blown fibres is 2 to 3 microns. The material was treated with fluorocarbon and lithium nitrate and subsequently heated before calendering as described above.

Abrasion resistance was measured on a Martindale abrasion tester using the test fabric as the abradent (i.e. fabric on fabric abrasion) and using weight loadings of 12 kpa. The average weight losses of the samples plus abradent after various numbers of abrasion cycles was measured (mg/1000 rubs).

Air permeability was measured in dm/min according to DIN standard 53 887 at a vacuum of 2 mbar and a test area of 20 $cm^2$. The results are from a statistically low base but nevertheless should approximate to average values.

The calendering rollers and conditions of the two examples are:

EFFECT OF VARIATION OF LINE SPEED

EXAMPLE I Smooth steel roller against polyamide roller.

| Temperature of steel roller | 167° C. |
|---|---|
| Pressure | 40 kg/cm. |
| Speed | 15 m/min. |

EXAMPLE II Smooth steel roller against polyamide roller.

| Temperature of steel roller | 167° C. |
|---|---|
| Pressure | 40 kg/cm. |
| Speed | 30 m/min. |

EXAMPLE III Smooth steel roller against polyamide roller.

| Temperature of steel roller | 167° C. |
|---|---|
| Pressure | 40 kg/cm. |
| Speed | 35 m/min. |

The results are as follows:

| SAMPLE | NO RUBS | AVERAGE WT LOSS mg | WT LOSS/ 1000 RUBS mg/1000 rubs | AIR PERME- ABILITY dm/min |
|---|---|---|---|---|
| BASE | 955 | 19.03 | 19.93 | 88.9 |
| Example 1 | 8000 | 2.90 | 0.36 | 12.0 |
| Example II | 3000 | 9.69 | 3.23 | 32.5 |
| Example III | 3000 | 8.60 | 2.87 | 38.0 |

EFFECT OF VARIATION OF TEMPERATURE

EXAMPLE I Smooth steel roller against polyamide roller.

| Temperature of steel roller | 167° C. |
|---|---|
| Pressure | 40 kg/cm. |
| Speed | 30 m/min. |

EXAMPLE II Smooth steel roller against polyamide roller.

| Temperature of steel roller | 175° C. |
|---|---|
| Pressure | 40 kg/cm. |
| Speed | 30 m/min. |

The results are as follows:

| SAMPLE | NO RUBS | AVERAGE WT LOSS mg | WT LOSS/ 1000 RUBS mg/1000 rubs | AIR PERME- ABILITY dm/min |
|---|---|---|---|---|
| BASE | 955 | 19.03 | 19.93 | 88.9 |
| Example 1 | 3000 | 9.69 | 3.23 | 32.5 |
| Example II | 7000 | 6.51 | 0.93 | 21.0 |

EFFECT OF VARIATION OF PRESSURE

EXAMPLE I Smooth steel roller against polyamide roller.

| Temperature of steel roller | 170° C. |
|---|---|
| Pressure | 10 kg/cm. |
| Speed | 15 m/min. |

EXAMPLE II Smooth steel roller against polyamide roller.

| Temperature of steel roller | 170° C. |
|---|---|
| Pressure | 20 kg/cm. |
| Speed | 15 m/min. |

EXAMPLE III Smooth steel roller against polyamide roller.

| Temperature of steel roller | 170° C. |
|---|---|
| Pressure | 25 kg/cm. |
| Speed | 15 m/min. |

EXAMPLE IV Smooth steel roller against polyamide roller.

| Temperature of steel roller | 170° C. |
|---|---|
| Pressure | 40 kg/cm. |
| Speed | 15 m/min. |

The results are as follows:

| SAMPLE | NO RUBS | AVERAGE WT LOSS mg | WT LOSS/ 1000 RUBS mg/1000 rubs | AIR PERME- ABILITY dm/min |
|---|---|---|---|---|
| BASE | 955 | 19.03 | 19.93 | 88.9 |
| Example 1 | 3000 | 31.50 | 10.50 | 86.0 |
| Example II | 3800 | 16.50 | 4.34 | 62.0 |
| Example III | 4000 | 8.30 | 2.08 | 34.0 |
| Example IV | 4600 | 19.70 | 4.28 | 18.0 |

That indicated as the Base material is nonwoven laminate material of the type described. The Examples in each case, are examples of material in accordance with the current invention having been hot smooth-calendered by different amounts.

The results show that material in accordance with the invention has a reduction in air permeability with increasing abrasion resistance; and that fabrics can be produced with very much improved abrasion resistance over the base fabric with good levels of air permeability.

For example, the material of Example III (of the table illustrating the effect of variation of line speed) has approximately seven times the abrasion resistance of the base fabric of Example I, (one seventh of the weight loss on abrasion) with slightly less than half the air permeability of the base fabric.

The following table shows the results of the abrasion resistance and air permeability on some examples of fabric material of the type described in accordance with the invention compared with a fabric not treated in accordance with the invention. All fabric examples are of spunbonded/meltblown/spunbonded construction of 1.8 oz per square yard (61 gsm) basis weight processed on wide-width commercial equipment.

EXAMPLE I Smooth steel roller against polyamide roller.

| Temperature of steel roller | 160° C. |
|---|---|
| Pressure | 100 kg/cm. |
| Speed | 60 m/min. |

EXAMPLE II Smooth steel roller against polyamide roller.

| Temperature of steel roller | 165° C. |
|---|---|
| Pressure | 100 kg/cm. |
| Speed | 40 m/min. |

EXAMPLE III Smooth steel roller against polyamide roller.

| Temperature of steel roller | 166° C. |
|---|---|
| Pressure | 80 kg/cm. |
| Speed | 60 m/min. |

EXAMPLE IV Smooth steel roller against polyamide roller.

| Temperature of steel roller | 168° C. |
|---|---|
| Pressure | 80 kg/cm. |
| Speed | 45 m/min. |

The results are as follows:

| SAMPLE | NO RUBS | AVERAGE WT LOSS mg | WT LOSS/ 1000 RUBS mg/1000 rubs | AIR PERME- ABILITY dm/min |
|---|---|---|---|---|
| BASE | 955 | 19.03 | 19.93 | 88.9 |
| Example 1 | 6000 | 8.82 | 1.47 | 26.0 |
| Example II | 10000 | 3.90 | 0.39 | 11.0 |
| Example III | 1100 | 11.61 | 10.55 | 45.3 |
| Example VI | 9000 | 10.26 | 1.14 | 15.3 |

Figure 6:
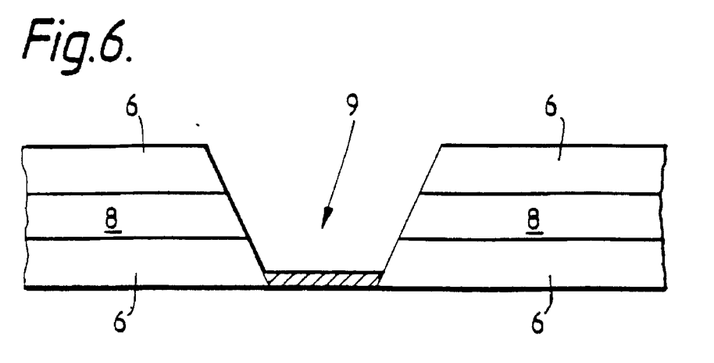
FIG. 6 is a cross section to an enlarged scale of a laminate in accordance with the invention.

FIG. 6 illustrates an example of a laminate material in accordance with the invention from which it will be seen that the material is composed of two outer layers 6 of spunbonded material sandwiching a central layer 8 of melt-blown material. The material has been treated by impregnating it with a fluorocarbon and the outer surface of each of the spunbonded layers has been hot calendered.

The laminate material has been subjected to embossing as illustrated at 9. These embossments are in the form of small bond areas normally arranged in a pattern e.g. a rectangular or diagonal pattern.

Figure 7A:
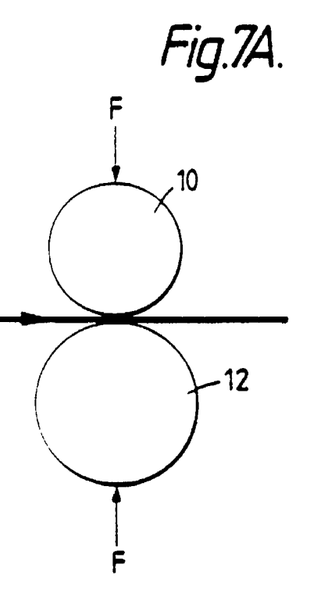
FIG. 7A is a diagram illustrating the arrangement of rollers for calendering material on one side.

The calendering may be carried out as indicated in FIG. 7 by a single pass between a steel roller 10 and a backing roller 12 (see FIG. 7A). The roller may be a 'NIPCO' type variable crown roller to ensure uniform pressure across the width especially when the material is 'wide' i.e. having a width of 1 to 2 meters.

Figure 7B:
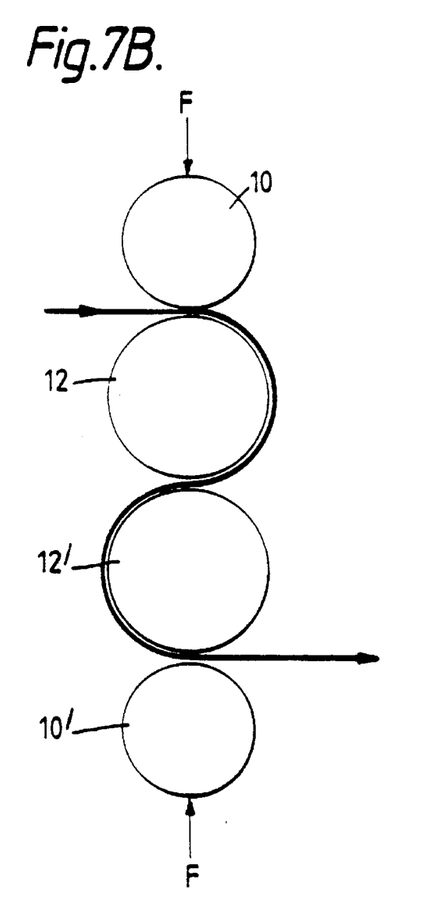
FIG. 7B is a diagram illustrating the arrangement of rollers for calendering material on both sides.

FIG. 7B shows the arrangement of a calender system used to simultaneously calender both sides of a fabric.

In each case pressure is applied as indicated by the arrows F1.

Figure 8:
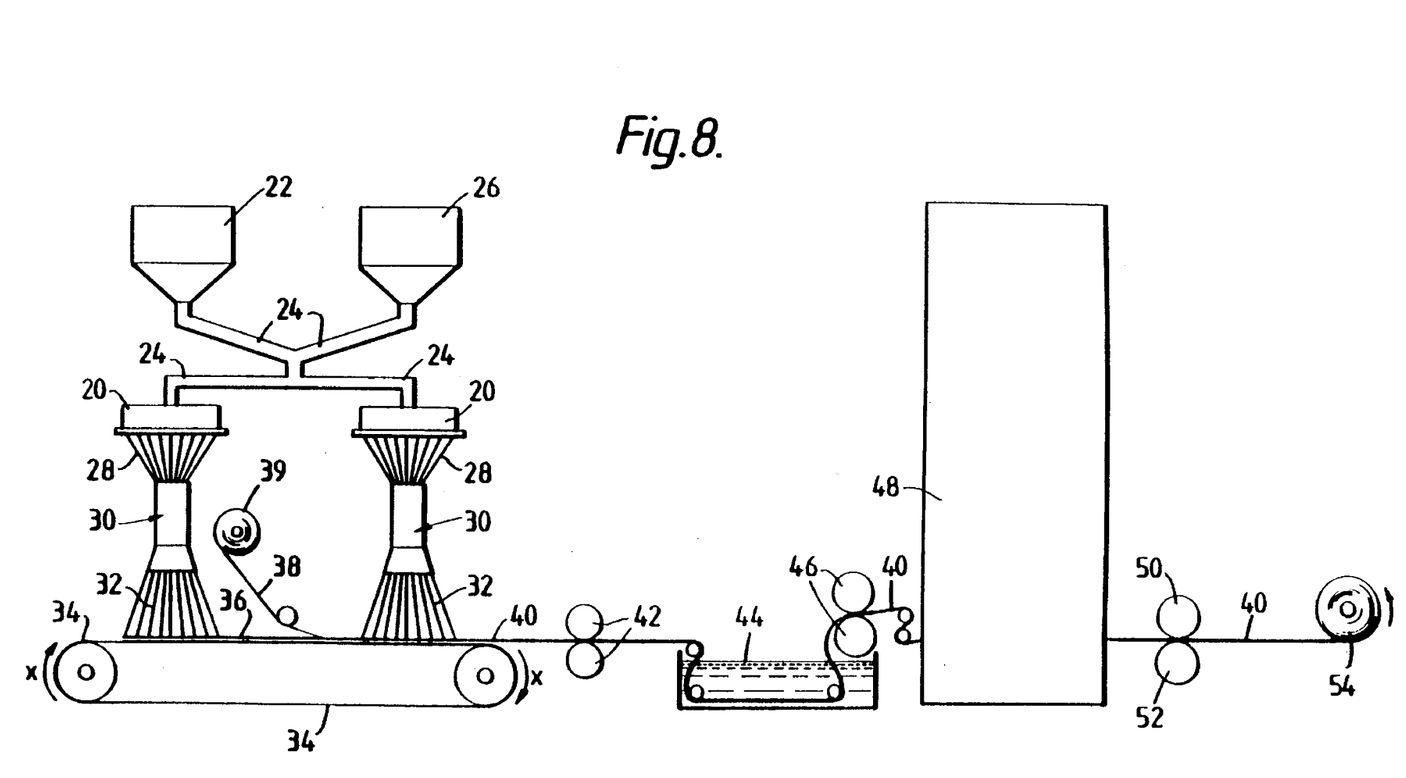
FIG. 8 is a diagram illustrating apparatus for producing laminate material in accordance with the invention.

Referring to FIG. 8 which is a schematic drawing of one example of apparatus for producing a laminate material in accordance with the invention, it will be seen that a spinneret 20 is fed with an appropriate polymer from a hopper 22 through inlet pipes 24 and with suitable pigments/additives from the second hopper 26. The fine polymer filaments 28 produced by the spinneret 20 pass through a high velocity air drawing system generally illustrated at 30 and the resultant filaments 32 are fed on to a moving forming screen 34, a vacuum being supplied beneath the screen so that the hot filaments form a tangled bonded web on the forming screen.

The layer 36 of spunbonded polymer is moved along by the movement of the forming screen which rotates in the direction of the arrows x beneath a layer of melt-blown fibres 38 formed from melt-blown 'unwind' unit 39.

A second layer of spunbonded polymer is produced by a spinneret and air drawing system similar to that described above to produce the first spunbonded layer 34, so that the laminate material illustrated at 40 leaving the forming screen comprises two outer layers 34, of spunbonded material sandwiching a central layer 38 of melt-blown material such as is illustrated in FIG. 6.

The laminate 40 is fed between two bonding rollers 42, one of which is provided with projections in a pattern so as to produce a pattern of depressed bond areas e.g. that shown at 9 in FIG. 6, over the whole surface of the laminate material.

The laminate material 40 is then fed into a bath 44 of a fluorocarbon and lithium nitrate mixture which to saturates the laminate. On leaving the bath, the laminate material is passed between two squeeze rollers 46 to remove excess liquid.

The impregnated web is then dried by passing it over a series of heated rollers, drums or the like within a standard drying unit generally indicated at 48 and the dried web is then passed between two calendered rollers 50/52, the top roller 50 being a heated steel roller and the bottom roller 52 being a backing roller.

In this arrangement the upper surface of the upper spunbonded layer 34 of the laminate material is thus calendered to produce the desired effect described hereinbefore and to create a laminate material in accordance with the invention.

The laminate is then wound on a rewound roller 54.

In an alternative arrangement the laminate may be produced by one apparatus and the laminate may then be treated by passing it through a bath, drying it and then calendering on a second separate apparatus.

We claim:

1. A laminate comprising a layer of spunbonded polymeric nonwoven filaments and a layer of meltblown polymeric fibers, the laminate having been treated with a thermal stabilizing agent forming an exterior fiber casing on at least one of said filaments and fibers, thermally pattern bonded and subsequently to the pattern bonding of the laminate, calendered by passing through a nip between two rolls including a smooth, hot roll resulting in increased surface abrasion resistance of an average weight loss per thousand rubs of 10.5 milligrams or less while retaining an open fiber structure providing an average air permeability of at least 11 dm/min per 20 cm² measured by DIN Std 53 887.

2. A laminate as claimed in claim 1 in which the thermal stabilizing agent is a fluorocarbon.

3. A process for making a nonwoven laminate material comprising the steps of, a) providing a layer of spunbonded polymeric nonwoven filaments and at least one other layer selected from nonwoven polymeric spunbonded filaments and nonwoven polymeric meltblown fibers, b) impregnating at least one of said layers with a thermal stabilizing agent forming an exterior fiber casing on at least one of said filaments and fibers, c) combining at least two of said layers by thermal pattern bonding, and d) passing said combined layers through a nip between two rolls including a smooth heated roll, thereby hot calendering at least one spunbonded layer of said combination of layers.

4. A process as claimed in claim 3 in which the calendering is carried out by passing the layers through the nip of a smooth heated roller and a backing roller.

5. A process as claimed in claim 4 wherein the heated roller is of steel and the backing roller is of a material selected from the group consisting of plastic, cotton, and paper.

6. A process as claimed in claim 4 wherein the heated roller is heated to a temperature substantially the same as the melting point of the polymer of the fibers in the layer to be calendered.

7. A process as claimed in claim 6 wherein the nip pressure is set so as to give a light pressure and the material is passed through the nip sufficiently quickly so that in effect the surface is given a shock heat treatment.

8. A process as claimed in claim 6 wherein the material is impregnated before calendering by heating.

9. A process as claimed in claim 6 wherein the material is impregnated before calendering with an antistatic and fluid repellent thermal stabilizing agent coating.

10. A process as claimed in claim 9 wherein the material is coated by running the material through a bath containing the antistatic and fluid repellent coating together with a wetting agent.

11. A process as claimed in claim 10 wherein, after coating, the material is squeezed to remove excess liquid, and is then passed over heated drums to drive off water.

* * * * *